(12) United States Patent
Jiang et al.

(10) Patent No.: US 8,730,121 B2
(45) Date of Patent: May 20, 2014

(54) LARGE SCALE FOLDED DIPOLE ANTENNA FOR NEAR-FIELD RFID APPLICATIONS

(75) Inventors: Bing Jiang, San Diego, CA (US);
Richard John Campero, San Clemente, CA (US); Steve Edward Trivelpiece, Irvine, CA (US)

(73) Assignee: Tyco Fire & Security GmbH, Rheinfall (CH)

( * ) Notice: Subject to any disclaimer, the term of this patent is extended or adjusted under 35 U.S.C. 154(b) by 1141 days.

(21) Appl. No.: 12/202,918

(22) Filed: Sep. 2, 2008

(65) Prior Publication Data

US 2009/0079573 A1    Mar. 26, 2009

Related U.S. Application Data

(60) Provisional application No. 60/969,576, filed on Aug. 31, 2007.

(51) Int. Cl.
*H01Q 9/26*       (2006.01)

(52) U.S. Cl.
USPC .......................................... 343/803; 343/793

(58) Field of Classification Search
USPC ................ 343/793, 795, 803, 806; 340/572.7
See application file for complete search history.

(56) References Cited

U.S. PATENT DOCUMENTS

| | | | |
|---|---|---|---|
| 6,147,653 A * | 11/2000 | Wallace et al. | 343/702 |
| 6,693,599 B1 * | 2/2004 | Chia et al. | 343/741 |
| 7,084,769 B2 | 8/2006 | Bauer | |
| 2002/0175805 A9 * | 11/2002 | Armstrong et al. | 340/10.31 |
| 2005/0093677 A1 | 5/2005 | Forster et al. | |
| 2005/0119035 A1 | 6/2005 | Miyano et al. | |
| 2006/0208957 A1 | 9/2006 | Iizuka et al. | |
| 2006/0232382 A1 | 10/2006 | Bauer | |
| 2008/0158087 A1 * | 7/2008 | Rofougaran | 343/810 |

FOREIGN PATENT DOCUMENTS

| | | |
|---|---|---|
| CA | 2414124 | 6/2004 |
| GB | 2254440 | 10/1992 |
| JP | 2005244283 A * | 9/2005 |

OTHER PUBLICATIONS

International Search Report issued Dec. 9, 2008 in PCT/US08/010348.

* cited by examiner

*Primary Examiner* — Dieu H Duong
(74) *Attorney, Agent, or Firm* — Rick Comoglio

(57) ABSTRACT

In accordance with a preferred embodiment of the invention, reader antennas are provided within storage fixtures or supporting fixtures for transporting RF signals between, for example, an RFID reader and an RFID tag. In a preferred embodiment, the RFID-enabled fixtures are implemented using an intelligent network, which may allow enhanced flexibility in controlling systems for interrogation of RFID antennas.

19 Claims, 3 Drawing Sheets

LARGE SCALE FOLDED DIPOLE ANTENNA FOR NEAR-FIELD RFID APPLICATIONS

This application is related to and claims priority from U.S. Provisional Application No. 60/969,576, filed Aug. 31, 2007, which application is expressly incorporated by reference herein.

FIELD OF THE INVENTION

The present inventions relate to a large scale folded dipole antenna or array of such antennas, used in a RFID system that requires large coverage, low cost, low thickness (profile), such as smart shelves or other storage or display fixtures used in UHF or microwave RFID item-level applications.

BACKGROUND

Radio frequency identification (RFID) systems typically use one or more reader antennas to send electromagnetic carrier waves encoded with digital signals to items containing or equipped with RFID tags. The use of such RFID tags to identify an item or person is well known in the art. In the case of passive RFID systems, an RFID tag is powered by the electromagnetic carrier wave. Once powered, the passive tag interprets the radio frequency (RF) signals and provides an appropriate response by creating a timed, intermittent disturbance in the electromagnetic carrier wave. These disturbances, which encode the tag response, are sensed by the reader through one of the reader's antennas, thus completing the reader-tag communications loop. In the case of active or semi-passive RFID systems the tag contains its own power source. In the active RFID systems, the power is used for communications with the reader by creating tag's own carrier wave and encoded RF signals; while in the semi-passive RFID systems, tag's power supply is solely used for powering the tag's IC, not for communication.

In most item-level RFID applications, each item is tagged with an associated unique ID. Item-level RFID can empower users to precisely track inventory and location of tagged items in real time or near real time. In many applications large quantities of tagged items are placed in a crowded environment, and often the passive RFID tags on or in those items have very small form factors. In order to realize item-level visibility, the reader antennas have to be brought into close proximity with these passive RFID tags due to the tags' short working range. However, traditional antennas are designed for far-field applications, not for near-field applications. In applying traditional antenna designs to near-field RFID applications we face several inherent problems: 1) some antenna parameters are no longer valid to evaluate the antenna performance, such as directivity; 2) there may exist dead zones in the proximity of the antenna, i.e., tagged items that fall in these zones will not be detected; 3) the effective coverage may not be large enough to cover a specified area. This last problem can be solved by implementing an antenna array. However, this increases the system cost, complexity, and response time.

SUMMARY

The present inventions relate to a large scale folded dipole antenna or array of such antennas.

In one aspect there is provided an antenna assembly for use with a predetermined carrier signal having a predetermined frequency and wavelength associated therewith, comprising: a dipole antenna, the dipole antenna including two electrically conductive elements of unequal lengths that are also not simple multiples of each other so that when transmitting at the wavelength of the carrier signal, at least one moving null is created within the dipole antenna, wherein each of the two electrically conductive elements is connected at one end to a common feed-point and has another end, wherein the two electrically conductive elements form a loop-like shape with a small gap between the another end of each of the two electrically conductive elements.

In another aspect there is provided a method of eliminating reception dead-spaces for a plurality of stationary RFID tagged items using a stationary RFID reader dipole antenna associated therewith that transmits at a predetermined carrier signal having a predetermined frequency and wavelength associated therewith to each of the plurality of stationery RFID tagged items, the method comprising the steps of: providing the stationery RFID reader dipole antenna with two electrically conductive elements of unequal lengths that are also not simple multiples of each other so that when transmitting at the wavelength of the carrier signal, at least one moving null is created within the stationery RFID reader dipole antenna, wherein each of the two electrically conductive elements is connected at one end to a common feed-point and has another end, wherein the two electrically conductive elements form a loop-like shape with a small gap between the another end of each of the two electrically conductive elements; and causing the stationery RFID reader dipole antenna to transmit the carrier signal to the plurality of stationery RFID tagged items so that the carrier signal within the stationery RFID reader dipole antenna will have at least one moving null created therein, wherein the moving null substantially eliminates the reception dead spaces that could otherwise occur between the stationery RFID reader dipole antenna and the plurality of stationery RFID tagged items.

These and other aspects and advantages of the embodiments will be described herein.

DETAILED DESCRIPTION

Introduction

Figure 1:
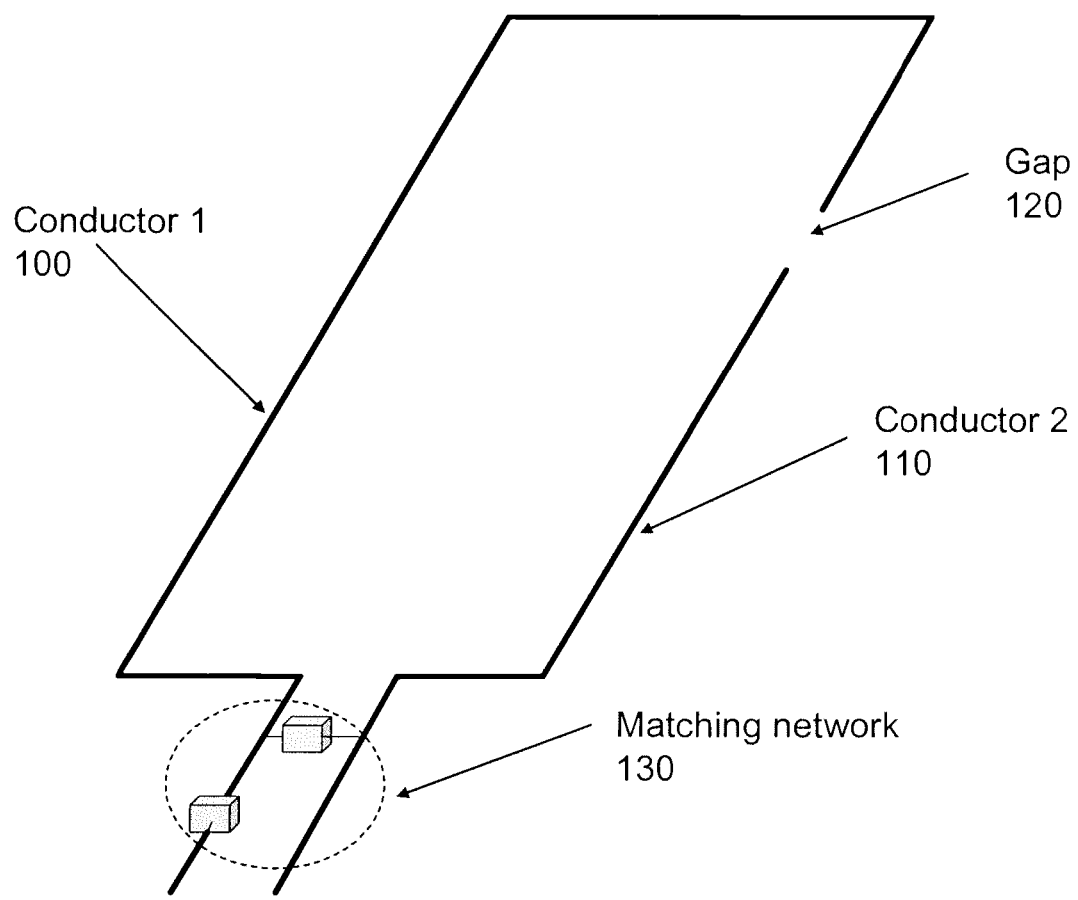
FIG. 1 shows a large scale folded dipole antenna with an impedance matching network, as described in the embodiments of the current inventions.

To overcome the disadvantages of traditional RFID antennas mentioned above, a large scale folded dipole antenna intended for near-field RFID implementations has been invented and is described below. By "large" we mean that the antenna's overall length (in at least one dimension) is preferably at least twice the wavelength of the RFID carrier (baseband) wave. Thus, a "large" dipole antenna is long relative to the wavelength of the waves being sent and received by the antenna. The traditional dipole anteima described in the prior art has only two conducting arms, usually with equal but sometimes with different lengths, though not with features that cause moving nulls as described herein. Dipole antennas have the attractive features of low cost, low profile, easy fabrication, and simple installation. As mentioned above, it is desired to use fewer antennas to cover a specified workspace for item-level RFID, i.e., an effective large antenna is preferred over an array of smaller antennas. However, large dipole antennas usually have nulls in their radiation patterns (points along the antenna where the emitted field strength is weak and where the antenna's ability to sense incoming signals is also weak), and the number of nulls increases with the increase of dipole size. The exact location of these nulls along the length of the traditional dipole antenna depends upon the wavelength of the signal and the length of the dipole. In general, for a linear dipole antenna conducting arm that is approximately N times as long as the baseband wavelength (where N=2, 3, 4, . . . ), then there will be approximately 2N−1 nulls along the conducting arm of the antenna. Because of these nulls, a larger dipole antenna (with a larger nominal coverage area) usually results in higher numbers of "dead zones" and areas of undetected RFID tags due to the nulls, and lower average signal intensity in the areas close to the nulls. In contrast to the prior art, the current invention describes an antenna in which the outer ends of two conducting arms of unequal lengths are brought close to one another, forming a two-dimensional antenna (similar to a loop with a gap). That is, whereas the dipole antenna in the prior art is generally straight with both conducting arms falling along a common line, the current invention deals with a bent or "folded" dipole antenna in which the conducting arms have been "folded" around so that the conducting arms of the antenna are curved, and fall upon or generally upon a circle, ellipse, oval, square, or other two-dimensional shape. It is emphasized that the outer ends of the two curved or bent conducting arms are not touching each other, but are near each other. Thus, the antenna, although bent or folded into a curved form, is not a true loop antenna, but is still a true dipole antenna in which the two conducting antenna arms are connected to a common feed cable or feed-point at the source ends, and left free (electrically unconnected) at the outer ends of the conducting arms. This cost-efficient antenna provides a desirable large coverage area without dead zones (or negligibly small dead zones) in its proximity, suitable for item-level RFID implementations. In the linear dipole antenna of the prior art, the nulls generally result from standing waves. In the newly invented two-dimensional folded or bent dipole antenna in which the two conducting arms have unequal lengths, the symmetry of the prior art antenna is broken, and the impact of the nulls is minimized. This is because of the constrictive and destructive interference of the waves traveling along the two conducting arms. This interaction, which occurs primarily across the gap and in the general region of the gap between the extreme ends of the two folded conducting arms, is complex and depends upon the gap size, and the length of the conducting arms (relative to each other and relative to the baseband wavelength). If the difference in the lengths of the two conducting arms is chosen appropriately, the length of time required by a wave to travel the length of one conducting arm will not be a simple fraction or multiple of the length of time required by a wave to travel the length of the other conducting arm. In such a case, there will exist a phase difference between the waves moving up and down the two conducting arms, and the constructive and destructive interference of the waves from the two conducting arms in the region of the gap will cause the nulls (located in the geometric plane containing the two curved conducting arms) to move from place to place over time. This creates a significant advantage in applications in which the RFID tagged items are stationary relative to the antenna. When the folded dipole antenna is used in these applications, the positions of the nulls will not, over time and in general, correspond with particular tags (since the nulls are moving relative to the tags). Thus, the use of the folded dipole antenna reduces the problem of dead zones in the space around the antenna, and makes it easier to read all of the tags.

The newly invented dipole antenna can be implemented on or inside the horizontal or vertical surfaces of retail, warehouse, home, or other fixtures such as (but not limited to) cabinets, shelves, drawers, racks, cases, desks, counters, chests, bins, or other places of storage used to hold and monitor RFID-tagged items.

Antenna Assembly

Preferred embodiments and applications will now be described. Other embodiments may be realized and changes may be made to the disclosed embodiments without departing from the spirit or scope of the inventions described herein. Although the preferred embodiments disclosed herein have been particularly described as applied to the field of RFID systems for near-field item-level implementations, it should be readily apparent that the invention may be applied to any application having the same or similar problems.

In the following description, a reference is made to the accompanying drawings which form a part hereof and which illustrate several embodiments. It is understood that other embodiments may be utilized and structural, configurational, and/or operational changes may be made without departing from the scope of the descriptions provided.

FIG. 1 is a drawing illustrating an exemplary dipole antenna assembly in accordance with the preferred embodiment. In the preferred embodiment, conducting arms or conducting elements 100 and 110 form a loop-like shape with a gap 120 between the outer ends of the conducting arms 100 and 110. In FIG. 1 conducting arm 100 is longer than conducting arm 110. Because of the length difference, the currents propagating along these two conductors have different phase shift, i.e., the electric field along the coverage is not symmetric or antisymmetric. As a result, the dead zones along the symmetric centers are removed or minimized. The invention requires that the dimension of the antenna along its long arm is preferably larger than or equal to one or two wavelengths, and the shorter arm is also not a simple multiple of the longer arm, which differentiates itself from other dipole antennas in near-field RFID applications. Arms 100 and 110 can be solid metal or other types of electrically conductive materials such as stamped foils or films printed with conductive ink, and are attached or fixed on a supporting dielectric material or substrate (not shown in FIG. 1). Matching network 130 is a circuit block easily anticipated by one skilled in the art which converts the antenna impedance to some standard or common reader terminal impedance (usually 50 ohm). The matching network may consist of some appropriate combination of resistors, inductors, or capacitors, according to a large number of alternative circuit designs known to those skilled in the art. A coaxial or "coax" cable is used to connect the antenna and the reader, with one conducting arm of the antenna electrically attached to the core conductor of the coaxial cable, and the other conducting arm attached to the shielding mesh (outer conductive layer) of the coaxial cable. If a balun is used in the system, the twisted two-wire cable can be used to connect the antenna and the reader.

The antenna assembly shown in FIG. 1 provides a large coverage area along the antenna cross section without dead zones or noticeable dead zones to RFID tags with regular size, which is realized mainly by tuning the location and size of the gap between the two conducting arm ends. This kind of coverage is the most important advantage over the prior art antenna designs. In the preferred embodiment the gap size is approximately one inch, but this may be varied depending upon the size and shape of the antenna to minimize the number and size of the nulls located in the geometric plane of the antenna.

Figure 2:
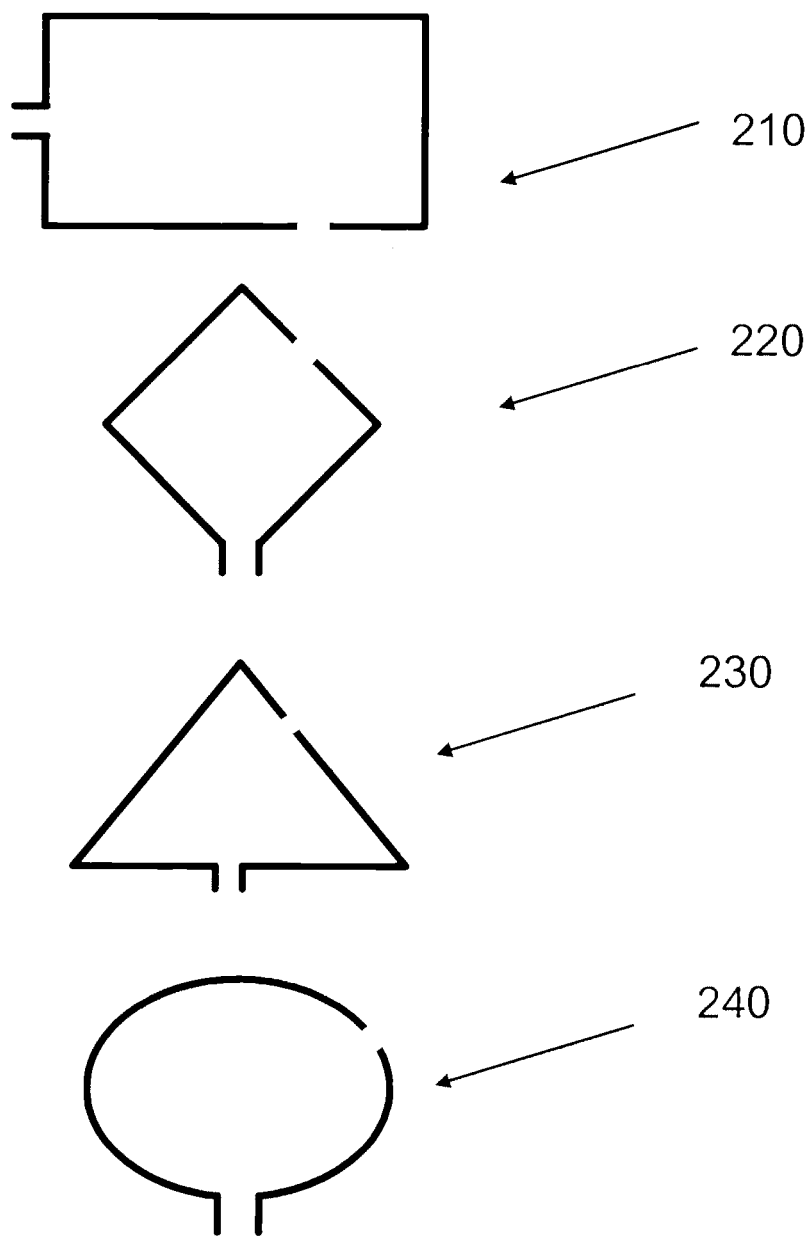
FIG. 2 shows examples of alternative antenna shapes.

The antenna can be implemented in any pattern or geometrical shape (e.g., square, rectangular, triangle, ellipse, or circle) or be fed from different common-feed point locations. Several of these shape alternatives are shown in FIG. 2, including a rectangular shape 210, rectangular shape fed from the corner 220, triangle shape 230, and ellipse 240. These alternative shapes are shown by way of example only and are not intended to limit the scope and application of the current invention. Irregular shapes can also be used (like the shape of the State of Texas) as can regular shapes.

System Usage

In accordance with the preferred embodiment of the invention, reader antennas are provided within storage fixtures or supporting fixtures (for example, shelves, cabinets, drawers, or racks) for transporting RF signals between, for example, an RFID reader and an RFID tag. The reader antennas may be placed in a variety of configurations which include but are not limited to configurations in which, for each antenna, the two conducting arms with unequal lengths are folded to form a loop-like shape with a gap. The size of antenna is larger than one wavelength (corresponding to the specified frequency band) at least along one dimension of the antenna.

In the preferred embodiment, the RFID-enabled storage fixtures or supporting fixtures are equipped with multiple dipole antennas. Furthermore, in the preferred embodiment, these RFID-enabled fixtures are implemented using an intelligent network in which the antennas are selected, activated, and otherwise managed by a supervisory control system consisting of one or more controllers and a host computer or host network, as described in U.S. Pat. No. 7,084,769, and U.S. Patent Application No. 20060232382, both of which are expressly incorporated by reference herein.

In a particular embodiment, the RFID-enabled fixtures can receive the carrier signals from different RFID reader antennas at different periods of time, and in a preferred mode of operation where each of the different RFID reader antennas will transmit such that there are at least one, and preferably two, different moving nulls therein. This redundancy features can be used both for further assurance that reception dead-space is eliminated when all of the reader antennas and tagged items are stationary, as well as to include security features achievable by using more than one RFID reader antenna for transmission.

Still further, in a system, if the dipole antennas that is stationery is different from other dipole antennas in its shape, this will also cause the moving nulls within each of the dipole antenna to be different, which can further assure that reception dead-space is eliminated when all of the reader antennas and tagged items are stationary.

Figure 3:
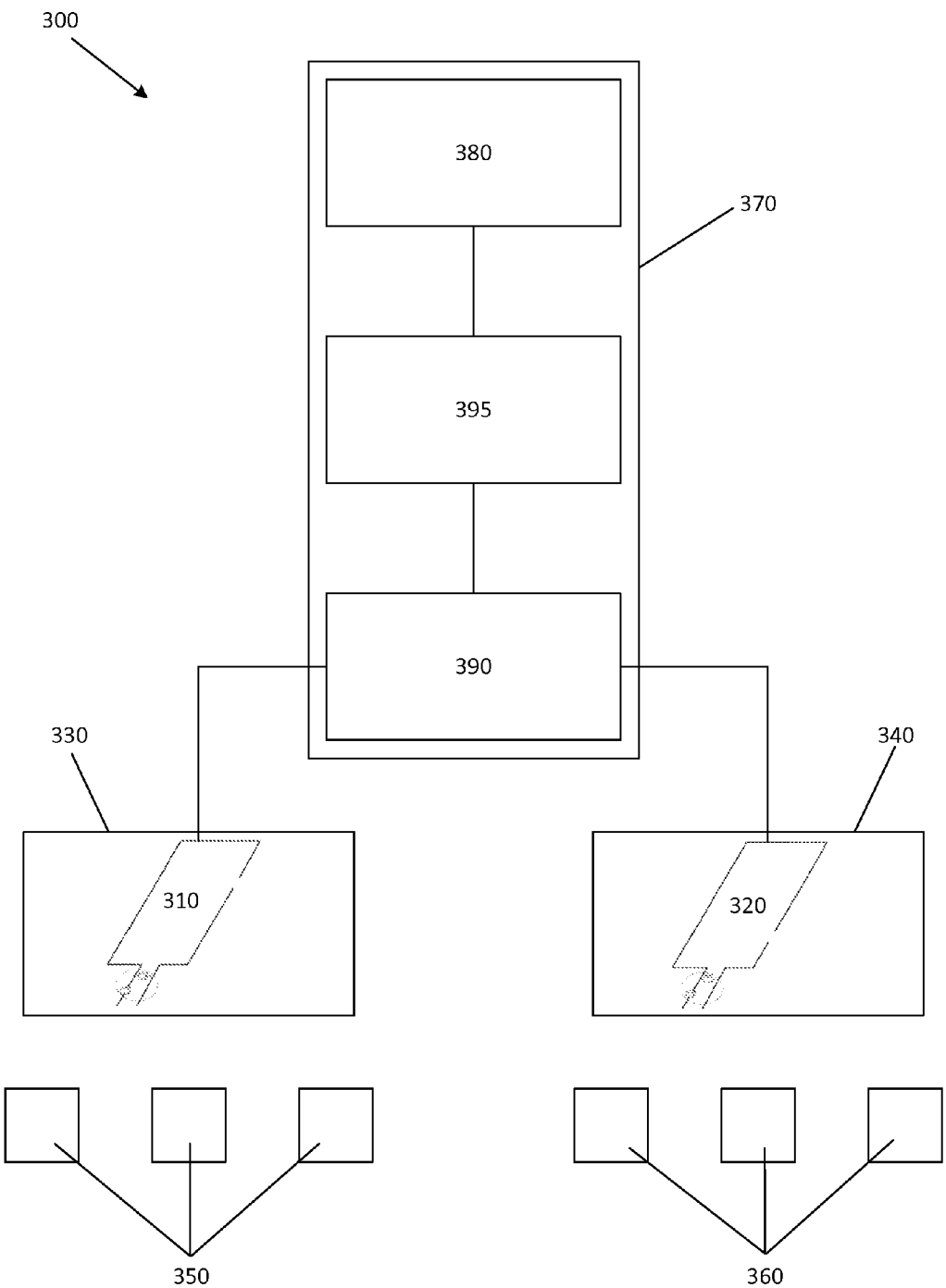
FIG. 3 shows a block diagram illustrating a multiple-antenna configuration and host system, as described in the embodiments of the current inventions.

Referring to FIG. 3, and in accordance with the forgoing description, there is provided an antenna assembly 300 for use with a predetermined carrier signal having a predetermined frequency and wavelength associated therewith, comprising a dipole antenna 310, the dipole antenna including two electrically conductive elements of unequal lengths that are also not simple multiples of each other so that when transmitting at the wavelength of the carrier signal, at least one moving null is created within the dipole antenna, wherein each of the two electrically conductive elements is connected at one end to a common feed-point and has another end, wherein the two electrically conductive elements form a loop-like shape with a small gap between the another end of each of the two electrically conductive elements.

There is further provided an antenna assembly 300 as described above, wherein the carrier signal has another wavelength, and further including: another dipole antenna 320, the another dipole antenna 320 comprising another two electrically conductive elements of unequal lengths that are also not simple multiples of each other so that when transmitting at the another wavelength of the carrier signal, at least one moving null is created within the another dipole antenna, wherein each of the another two electrically conductive elements is connected at a first end to another common feed-point and has a second end, wherein the another two electrically conductive elements form a loop-like shape with another small gap between the second end of each of the another two electrically conductive elements.

There is further provided an antenna assembly 300 as described above, wherein the wavelength and the another wavelength are the same. There is further provided an antenna assembly 300 as described above, wherein the wavelength and the another wavelength are different. There is further provided an antenna assembly 300 as described above, wherein the two electrically conductive elements are disposed within a cover 330 and the another two electrically conductive elements are disposed within another cover 340.

There is further provided an antenna assembly as described above, wherein RFID tagged items 350 and 360 monitored by a host system 370 are placed in the vicinity of at least one of the cover 330 and the another cover 340. There is further provided an antenna assembly 300 as described above, wherein the host system 370 comprises: a host computer 380; a switch control unit 390; an RFID reader 395 coupled to each of the dipole antenna 310 and the another dipole antenna 320 through the switch control unit 390 and coupled to the host computer 380, wherein the RFID reader 385 and the switch control unit 390 are controlled by the host computer 380.

There is further provided an antenna assembly 300 as described above, wherein the loop-like shape of the dipole antenna 310 is different from the loop-like shape of the another dipole antenna 320 and the at least one null in the dipole antenna is different from the at least one null in the another dipole antenna. There is further provided an antenna assembly 300 as described above, wherein the two electrically conductive elements are disposed within a cover 310.

There is further provided an antenna assembly 300 as described above, wherein RFID tagged items 350 and 360 monitored by a host system are placed in the vicinity of the dipole antenna.

There is further provided an antenna assembly 300 as described above, wherein the host system 370 comprises: a host computer 380; an RFID reader 395 coupled to the dipole antenna 310 and coupled to the host computer 380, wherein the RFID 395 reader is controlled by the host computer 380.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed as new and desired to be protected by Letters Patent of the United States is:

1. An antenna assembly for use with a predetermined carrier signal having a predetermined frequency and wavelength associated therewith, comprising:
    a dipole antenna having an overall length that is at least twice the wavelength of the carrier signal, the dipole antenna including two electrically conductive elements of unequal lengths that are also not simple multiples of each other so that when transmitting at the wavelength of the carrier signal, at least one moving null is created within the dipole antenna, wherein each of the two electrically conductive elements is connected at a first end to a common feed-point and has a second end, wherein the two electrically conductive elements form a loop-like shape with a gap between the second ends of the two electrically conductive elements, and wherein the second ends of the two electrically conductive elements are directed toward one another.

2. The antenna assembly of claim 1 wherein the loop-like shape is regular.

3. The antenna assembly of claim 2 wherein the regular shape is one of rectangular, circular, elliptical, and triangular.

4. The antenna assembly of claim 3, wherein the common feed-apoint can be anywhere along the shape.

5. The antenna assembly of claim 3 wherein a longer one of the two electrically conductive elements is longer than the wavelength of the predetermined carrier signal.

6. The antenna assembly of claim 1 wherein the loop-like shape is irregular.

7. The antenna assembly of claim 6, wherein the common feed-apoint can be anywhere along the shape.

8. The antenna assembly of claim 6 wherein a longer one of the two electrically conductive elements is longer than the wavelength of the predetermined carrier signal.

9. An antenna assembly of claim 1 wherein the carrier signal has a second wavelength, and further including:
    a second dipole antenna, the second dipole antenna comprising a second two electrically conductive elements of unequal lengths that are also not simple multiples of each other so that when transmitting at the another wavelength of the carrier signal, at least one moving null is created within the second dipole antenna, wherein each of the second two electrically conductive elements is connected at a first end to a second common feed-point and has a second end, wherein the second two electrically conductive elements form a loop-like shape with a second gap between the second ends of the second two electrically conductive elements.

10. The antenna assembly of claim 9 wherein the wavelength and the second wavelength are the same.

11. The antenna assembly of claim 9 wherein the wavelength and the second wavelength are different.

12. The antenna assembly of claim 9 wherein the two electrically conductive elements are disposed within a cover and the second two electrically conductive elements are disposed within second cover.

13. The antenna assembly of claim 12 wherein RFID tagged items monitored by a host system are placed in the vicinity of at least one of the cover and the second cover.

14. The antenna system of claim 13 wherein the host system comprises: a host computer; a switch control unit; an RFID reader coupled to each of the dipole antenna and the second dipole antenna through the switch control unit and coupled to the host computer, wherein the RFID reader and the switch control unit are controlled by the host computer.

15. The antenna system of claim 9 wherein the loop-like shape of the dipole antenna is different from the loop-like shape of the second dipole antenna and the at least one null in the dipole antenna is different from the at least one null in the second dipole antenna.

16. The antenna assembly of claim 1 wherein the two electrically conductive elements are disposed within a cover.

17. The antenna assembly of claim 1 wherein RFID tagged items monitored by a host system are placed in the vicinity of the dipole antenna.

18. The antenna system of claim 17 wherein the host system comprises:
    a host computer;
    an RFID reader coupled to the dipole antenna and coupled to the host computer, wherein the RFID reader is controlled by the host computer.

19. The antenna assembly of claim 1 wherein the gap has a length of about one inch.

* * * * *